June 11, 1963

G. M. GASKILL 3,092,997

HEAT-SENSING DEVICE

Filed Sept. 18, 1961

INVENTOR.
George M. Gaskill
BY
Paul J. Reising
ATTORNEY

United States Patent Office 3,092,997

Patented June 11, 1963

3,092,997

HEAT-SENSING DEVICE

George M. Gaskill, Kokomo, Ind., assignor to General Motors Corporation, Detroit, Mich., a corporation of Delaware Filed Sept. 18, 1961, Ser. No. 138,903

7 Claims. (Cl. 73—355)

This invention relates to a heat-sensing device particularly useful as a control means for air conditioning systems on automotive vehicles.

The comfort level for passengers in modern automobiles is directly affected not only by the outside ambient temperature but also by the amount of solar radiation to which the automobile is exposed. Hence, the controls for an automobile air conditioning system, whether it be a heating system or a cooling system, should ideally include means for regulating the output of the system not only in accordance with outside air temperature but also in accordance with the amount of sunlight.

It is an object of the present invention to provide a temperature-sensing device which registers the heat level as affected both by the ambient atmosphere and by the solar radiation level. Another object of the invention is to provide a temperature-sensing device which is affected by the ambient temperature level and by the solar radiation level and which compensates for short periodic fluctuations in the solar radiation level. Briefly, these objects are accomplished in accordance with the invention by a heat-sensitive element enclosed within a solar radiation transparent housing, the heat-sensitive element being protected from direct exposure to the solar radiation by a shielding layer of an opaque material of low heat conductivity which absorbs the solar radiation and converts it to heat, such heat then being transmitted by the material slowly and at a relatively uniform rate to the sensing element. Because the covering material serves in the capacity of a heat sink, the transmission of heat to the heat-sensing element is at a relatively uniform rate irrespective of short periodic fluctuations in the amount of sunlight to which the unit is exposed as, for example, on a day with scattered moving clouds. Hence, rapid fluctuations in the heat registered by the device due to alternate short periods of sunlight and overcast are prevented.

The shielding layer can be of any opaque material of low thermal conductivity (i.e., a coefficient of heat conductivity expressed in calories/cm. sec. degree C. of not more than about 0.001), preferably a fibrous or other porous low density material such, for example, as low density absorbent paper, sponge plastic, matted pulverant, cork, cloth or felt, the latter being especially desirable. For optimum light absorption and minimum reflectivity, the material should preferably be of a dark color, ideally black.

Other objects and features of the invention will appear more clearly from the following detailed description thereof made with reference to the accompanying drawings in which.

Figure 1:
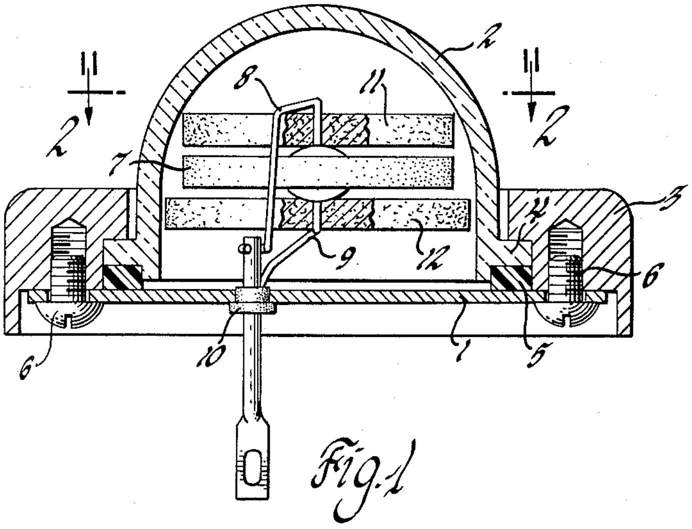
FIGURE 1 shows a side view in section of a preferred embodiment.
Figure 2:
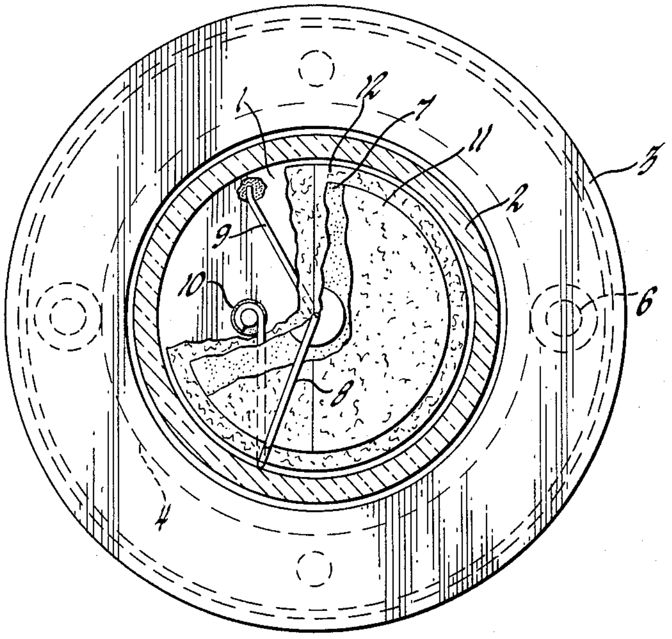
FIGURE 2 shows a top view, taken on the line 2—2 of FIGURE 1, but with parts broken away.

Referring now to the drawings, the device shown includes a housing formed by a base plate 1 and a transparent dome 2, made of glass or transparent plastic, which is secured to the base plate by means of a bezel 3 which engages a circumferential flange 4 at the base of the dome, a rubber gasket 5 between the flange and the base plate providing a seal. Suitable threaded members such as shown at 6 serve to secure the base plate, bezel, dome and gasket in assembled relationship. Secured within the housing and spaced from the walls thereof is a thermistor, i.e., a heat-sensitive resistor element, 7 which can be of any suitable heat-sensitive resistance composition well known in the art. In the particular embodiments shown, the thermistor consists of a sintered mixture of about 50% manganese oxide, 25% cobalt oxide and 25% nickel oxide, the resistance of such composition being an inverse function of the temperature to which it is exposed. Metal wires 8 and 9 bonded to the top and bottom respectively of the thermistor constitute the electrical leads and also serve as the securement means for the thermistor within the housing. Lead 8 extends through base plate 1, from which it is electrically insulated by grommet 10, and lead 9 is bonded into contact with the metal base plate which serves as a ground connection for the circuit.

A pair of black felt discs 11 and 12, one above and the other below the thermistor, are also supported by the thermistor lead wires, the upper felt disc 11 shielding the thermistor from sunlight and the lower felt disc 12 serving chiefly to thermally insulate the thermistor from the base plate 1 but also serving to prevent reflected sunlight from impinging on the thermistor. The felt discs, and particularly the upper felt disc, function to transmit to the thermistor the heat resulting from the inpingement of sunlight on the discs and additionally serve as a heat sink whereby the heat resulting from intermittent sunlight is transmitted at a relatively uniform rate to the thermistor. Also, the felt discs function to inhibit the flow of heat away from the thermistor and hence to control its rate of cooling thereby further assuring against rapid fluctuations in resistance of the thermistor. Each of the felt discs has a radial slit so it can be conveniently fitted over its supporting lead wire during assembly.

The light transparent housing functions to provide a dead air space around the thermistor and thereby prevents air movement and water vapor from affecting the temperature reading at the thermistor. The entire assembly can be secured by the base plate to an automobile in any desired location, for example, to the roof or cowl, and the leads 8 and 9 electrically connected to control the output of the automobile air conditioning system in accordance with the temperature reading, i.e., the electrical resistance, of the thermistor 7.

While the invention has been described in detail by reference to a particular embodiment thereof, it should be understood that various changes may be made, all within the full and intended scope of the claims which follow.

I claim:

1. A heat sensing device comprising a light transparent housing, a heat sensitive element in said housing and a light shielding layer of an opaque material of low heat conductivity over said heat sensitive element to absorb and convert to heat light which would otherwise impinge on said element and to transmit such heat to said element slowly and at a relatively uniform rate.

2. A heat sensing device comprising a light transparent housing, a heat sensitive element in said housing and a light shielding layer of an opaque porous low density material of low heat conductivity over said heat sensitive element to absorb and convert to heat light which would otherwise impinge on said element and to transmit such heat to said element slowly and at a relatively uniform rate.

3. A heat sensing device comprising a light transparent housing, a heat sensitive resistor in said housing and a light shielding layer of a dark colored opaque porous low density material of low heat conductivity over said heat sensitive resistor to absorb and convert to heat light which would otherwise impinge on said resistor and to transmit such heat to said resistor slowly and at a relatively uniform rate.

4. A heat sensing device comprising a light transparent housing, a heat sensitive element in said housing and a light shielding layer of felt over said heat sensitive element to absorb and convert to heat light which wound otherwise impinge on said element and to transmit such heat to said element slowly and at a relatively uniform rate.

5. A heat sensing device comprising a light transparent housing, a heat sensitive resistor in said housing and a light shielding layer of dark colored felt over said heat sensitive resistor to absorb and convert to heat light which would otherwise impinge on said resistor and to transmit such heat to said resistor slowly and at a relatively uniform rate.

6. A heat sensing device comprising a housing formed by a base plate and a light transparent enclosure secured in sealed relationship thereto, a heat sensitive resistor secured within and spaced from said housing, a thermal insulator body between said resistor and said base plate and a light shielding layer of dark colored porous low density material of low heat conductivity between said resistor and said transparent enclosure to absorb and convert to heat light which would otherwise impinge on said resistor and to transmit such heat to said resistor slowly and at a relatively uniform rate.

7. A heat sensing device comprising a housing formed by a base plate and a light transparent dome secured to said base plate in sealed relationship therewith, a heat sensitive resistor having a pair of lead wires extending therefrom and supported within said housing in spaced relationship therewith by said lead wires, a body of thermal insulating material between said resistor and said base plate and a light shielding layer of dark colored felt between said resistor and said dome to absorb and convert to heat light which enters said dome and to transmit such heat to said resistor slowly and at a relatively uniform rate.

References Cited in the file of this patent

UNITED STATES PATENTS

| | | |
|---|---|---|
| 2,021,491 | Ruben | Nov. 19, 1935 |
| 3,030,810 | Byrnes | Apr. 24, 1962 |
| 3,054,917 | Eberhardt | Sept. 18, 1962 |